C. M. MILLER.
ATTACHMENTS FOR VERTICAL STEAM-BOILERS.

No. 194,527. Patented Aug. 28, 1877.

WITNESSES
Franck L. Ouland
C. F. Brown

INVENTOR
Cassius M. Miller
By Hill & Ellsworth
his ATTORNEYS

UNITED STATES PATENT OFFICE.

CASSIUS M. MILLER, OF PHELPS, N. Y., ASSIGNOR TO EDGAR E. MILLER.

IMPROVEMENT IN ATTACHMENTS FOR VERTICAL STEAM-BOILERS.

Specification forming part of Letters Patent No. 194,527, dated August 28, 1877; application filed August 16, 1877.

*To all whom it may concern:*

Be it known that I, CASSIUS M. MILLER, of Phelps, in the county of Ontario and State of New York, have invented certain new and useful Improvements in Attachments for Vertical Steam-Boilers; and I do hereby declare that the following is a full, clear, and exact description thereof, reference being had to the accompanying drawings, forming part of this specification, in which—

Figure 1:
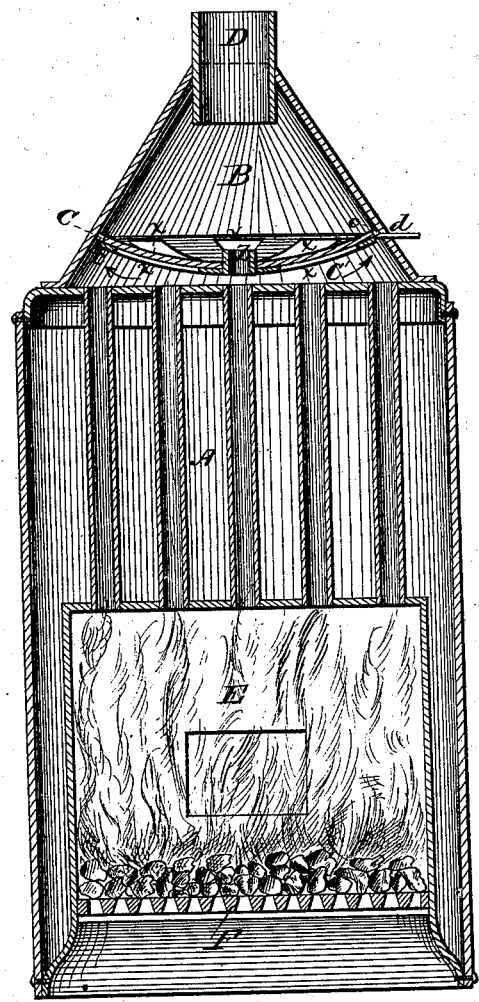
Figure 2:
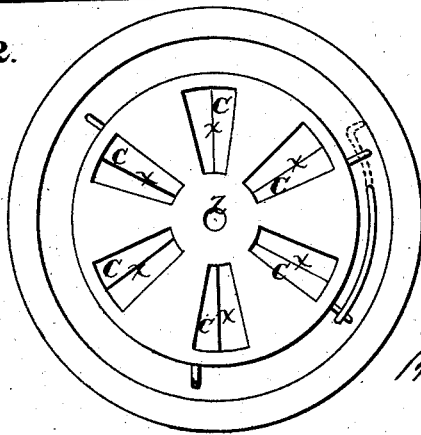

Figure 1 is a vertical section of a vertical tubular boiler, with smoke chamber and pipe attached; and Fig. 2, an inverted view of the conical smoke-chamber, showing the draft and heat regulator.

My invention has for its object the complete regulation, equalization, distribution, and control of the heat throughout and above the top of the boiler, as well as the arrest of sparks from the furnace; and to this end it consists in the arrangement within the dome or conical smoke-chamber of an annular dish-shaped disk provided with ports, and the combination therewith of a movable disk fitted thereto, provided with corresponding ports, adapted to leave an annular draft-space, $c$, over their circumference, which, in connection with the center ports, effects the objects stated by the adjustment of the movable disk, operated from without by a curved rod passing through a hole or opening in the side of the dome, and in the combination with the conical smoke-chamber or dome, and the annular space formed therein by the perforated disk of a flue projecting or extending down into the same so as to arrest the passage of sparks or other solid matter, and passing over the circumference of the disk.

A represents a boiler, arranged, as usual, above a suitable furnace or fire-box, E, upon the top of which boiler is secured in any convenient manner the conical smoke-chamber B. Within this chamber B is fixed a disk, C, provided with ports $x\ x$, as shown, an annular space being left around this disk sufficient for ordinary draft. C' represents a movable disk, also provided with ports corresponding with those on disk C, fitted to oscillate around a pivot, Z, and having connected therewith a bent or curved rod, $d$, extending through the side of the chamber for convenience of operation.

Extending downward into the chamber B is a section of the smoke-flue D, which operates a check to the upward exit of sparks or solid matter.

F represents the grate with fuel thereon. By my arrangement of disks, which I call "draft-regulator and heat-equalizer," it will be observed that the draft may be regulated so as to cause a perfectly equal combustion over the whole surface of the grate and the passage of the products of combustion mostly through the outer flues or tubes, or equally through them all at the will of the operator, and by this means and the reflection from the disks upon the top of the boiler the heat may be kept uniform throughout all parts of the boiler.

It will be observed that there is nowhere a direct or straight passage for the smoke and sparks. The sparks must, therefore, be thrown outward over the dished edge of the disk against the inclined walls of the chamber B, and that part thereof which may remain is carried along until arrested by the downward-projecting flue D. It will also be observed that the disk C', by means of the curved rod $d$, can be readily manipulated, while only a small aperture is required through the side of the smoke-chamber for the passage of said rod.

Having thus fully described my invention, what I claim as new, and desire to secure by Letters Patent, is—

1. The combination, in a vertical tubular boiler, of the fixed and movable perforated dish-shaped disks C and C', with the boiler-flues and the draft annular space $c$, formed by the dish-shaped disks and the inner wall of the conical chamber B, whereby the products of combustion may pass centrally through the disks or over their circumference, or both, direct from the flues, and thereby obtain complete regulation, equalization, distribution, and control of the heat through the flues and above the top of the boiler, as herein set forth.

2. The fixed and movable disks C and C', having their lowest central point in near relation to the top flue-sheet, and increasing the space between the disks and flue-sheet toward the circumference of said disks, and at the flue-space c, formed thereby, as described, whereby the products of combustion are caused to pass mostly through the outer flue-tubes, or equally through them all, under a direct draft, as described.

3. The combination, with the heat-regulating disks C and C', and circumferential flue-space c formed thereby, of the inwardly-projecting smoke-flue D, and the conical chamber B, substantially as and for the purpose stated.

4. The combination, with a circular oscillating valve or heat-equalizer, of a curved operating-rod, substantially as and for the purpose specified.

CASSIUS M. MILLER.

Witnesses:
 DANIEL TOWNER,
 M. E. BOOTH.